United States Patent
Keesara et al.

(10) Patent No.: US 11,019,028 B2
(45) Date of Patent: May 25, 2021

(54) USE OF DHCP TO AUTOMATICALLY ASSIGN NICKNAMES IN A SPBM NETWORK

(71) Applicant: EXTREME NETWORKS, INC., San Jose, CA (US)

(72) Inventors: Srikanth Keesara, Tewksbury, MA (US); Bjorn Haas, Darien, CT (US); Constantin Barcaru, Bucharest (RO)

(73) Assignee: Extreme Networks, Inc., San Jose, CA (US)

( * ) Notice: Subject to any disclaimer, the term of this patent is extended or adjusted under 35 U.S.C. 154(b) by 531 days.

(21) Appl. No.: 15/870,069

(22) Filed: Jan. 12, 2018

(65) Prior Publication Data
US 2019/0222557 A1    Jul. 18, 2019

(51) Int. Cl.
*H04L 29/12*    (2006.01)

(52) U.S. Cl.
CPC .......... *H04L 61/30* (2013.01); *H04L 61/2015* (2013.01); *H04L 61/2061* (2013.01); *H04L 61/6095* (2013.01)

(58) Field of Classification Search
CPC ........................... H04L 61/30; H04L 61/2015
See application file for complete search history.

(56) References Cited

U.S. PATENT DOCUMENTS

| | | | | |
|---|---|---|---|---|
| 7,046,666 B1 * | 5/2006 | Bollay | .............. | H04L 29/12009 370/392 |
| 7,633,888 B1 * | 12/2009 | Seifer | ................. | H04L 29/1232 370/254 |
| 8,125,928 B2 * | 2/2012 | Mehta | ................... | H04L 49/351 370/254 |
| 2010/0135302 A1 * | 6/2010 | Ra | ......................... | H04L 12/413 370/392 |
| 2010/0180016 A1 * | 7/2010 | Bugwadia | ............. | G06F 9/4411 709/220 |
| 2011/0019678 A1 * | 1/2011 | Mehta | ................... | H04L 45/245 370/401 |
| 2012/0113817 A1 * | 5/2012 | Fitzgerald | ............... | H04L 41/12 370/248 |
| 2013/0077624 A1 * | 3/2013 | Keesara | .............. | H04L 12/4662 370/390 |
| 2013/0121150 A1 * | 5/2013 | Sajassi | ................ | H04L 12/4633 370/235 |
| 2013/0188521 A1 * | 7/2013 | Jain | ....................... | H04L 12/185 370/255 |

(Continued)

*Primary Examiner* — Esther B. Henderson
(74) *Attorney, Agent, or Firm* — Sterne, Kessler, Goldstein & Fox P.L.L.C.

(57) ABSTRACT

Systems, methods, and apparatuses are disclosed herein for automatically assigning nicknames in a SPBM network. In some aspects, a first switch of a plurality of switches in the SPBM network is detected as being designated as responsible for assigning nicknames to the plurality of switches. Control circuitry responsively instantiates, at the nick name server, a DHCP service. The control circuitry detects, at the nickname server, a respective other switch of the plurality of switches in the SPBM network, and responsively assigns, using the DHCP service, a respective IP address for the respective other switch. A host portion of the respective IP address is assigned as the nickname for the respective other switch.

20 Claims, 4 Drawing Sheets

(56) References Cited

U.S. PATENT DOCUMENTS

| | | | |
|---|---|---|---|
| 2014/0269719 A1* | 9/2014 | Ramesh | H04L 12/4641 |
| | | | 370/392 |
| 2015/0052262 A1* | 2/2015 | Chanda | H04L 61/2015 |
| | | | 709/245 |
| 2015/0074246 A1* | 3/2015 | Premji | H04L 41/0886 |
| | | | 709/220 |
| 2016/0014073 A1* | 1/2016 | Reddy | H04L 67/38 |
| | | | 713/2 |
| 2016/0087847 A1* | 3/2016 | Krithivas | H04L 41/12 |
| | | | 709/224 |
| 2016/0112252 A1* | 4/2016 | Notari | H04L 41/0843 |
| | | | 709/221 |
| 2016/0315814 A1* | 10/2016 | Thirumurthi | H04L 67/1008 |
| 2016/0337426 A1* | 11/2016 | Shribman | H04L 65/4084 |

* cited by examiner

202 — IP Address: 10.234.0.10/12
204 — Subnet: 10.224.0.0
206 — Host (Nickname): 0.10.0.10

USE OF DHCP TO AUTOMATICALLY ASSIGN NICKNAMES IN A SPBM NETWORK

BACKGROUND

Multicast traffic that is sent over a Shortest Path Bridging (SPB) over Media Access Control in Media Access Control (MAC in MAC) network (collectively, a SPBM network) is tagged with a Shortest Path Source Identifier (SP Source ID), also referred to herein as "nickname," or "SPBM Nickname," that represents a source of the traffic. The nickname may be used to identify the shortest path tree (rooted at the source, which may be an ingress border edge bridge (BEB)) that the multicast traffic has followed in the SPBM network. Nicknames should be unique; if more than one source of multicast traffic share a same nickname, then services of the SPBM network are likely to be disrupted.

SUMMARY

Systems and methods are disclosed herein for automatically assigning nicknames in a SPBM network (in a manner that ensures that all nicknames are unique). In some aspects of the disclosure, control circuitry at a first switch of a plurality of switches in the SPBM network detects a designation of the first switch as being responsible for assigning nicknames. The control circuitry maps a pool of nicknames to a pool of Internet Protocol (IP) addresses, and instantiates, at the first switch, a Dynamic Host Configuration Protocol (DHCP) service.

The control circuitry may detect a respective other switch of the plurality of switches in the SPBM network. In response to detecting the respective other switch, the control circuitry may assign, using the DHCP service, a respective IP address for the respective other switch. The respective other switch may then extract the host portion of the respective IP address, and assign that host portion as a nickname of the respective other switch. In some cases, a user may define a range of host portions that the user desires for automatic assignment. For example, the user may wish to reserve a subset of available nicknames for manual assignment, and may thus wish to limit automatic nickname assignment to host portions that are not part of the reserved subset. In such cases, the control circuitry may instruct the DHCP service to assign IP addresses that use a host portion that corresponds to a nickname that is not part of the reserved subset.

In some embodiments, the control circuitry may detect the designation of the first switch as being responsible for assigning nicknames by receiving input from a user, and determining whether the input requests designation of the first switch as being responsible for assigning nicknames. In response to determining that the input requests designation of the first switch as being responsible for assigning nicknames, the control circuitry may detect the designation of the first switch as being responsible for assigning nicknames. As described above, the input may specify a range of host portions to be used by the DHCP service to guide IP address assignment.

In some embodiments, the control circuitry, when assigning, using the DHCP service, the respective IP address for the respective other switch, selects the respective IP address for assignment, and determines whether the selected IP address has been assigned to any switch of the plurality of switches. In response to determining that the selected IP address has been assigned to any switch of the plurality of switches, the control circuitry refrains from assigning the selected IP address as the respective IP address for the respective other switch, and assigns a different IP address as the respective IP address for the respective other switch.

The control circuitry, when assigning, using the DHCP service, the respective IP address for the respective other switch, may adopt a DHCP lease time for the respective IP address that is longer than a reboot time of the respective other switch. The control circuitry may detect that the respective other switch has rebooted, and may maintain the assignment for the respective IP address to the respective other switch notwithstanding that the respective other switch has rebooted.

In some embodiments, the respective nickname comprises a 20-bit portion of the host portion of the IP address. Together, the 20-bit nickname and a 24-bit Internet Service Instance Identifier (I-SID) may form a multicast address (termed a "B-MAC" address) for use on the SPBM network. The IP address may include the nickname (in the host portion, but does not include the I-SID.

The respective other switch, when transmitting multicast traffic over the SPBM network, may include the respective nickname in the multicast traffic. The respective other switch may additionally include a (e.g., 24-bit) I-SID. The I-SID may represent a traffic flow, and a switch of the plurality of switches may prune traffic of the traffic from streams with downstream nodes that do not subscribe to the traffic flow based on the I-SID value. A downstream switch of the plurality of switches on the SPBM network that receives the multicast traffic may determine the shortest path tree from which the multicast traffic has traveled based on the nickname.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

A nickname of a switch (interchangeably used with the terms "bridge" and "node" herein) is a particularly sensitive configuration parameter. If two different switches are assigned a same nickname, network failure may result. For example, a loss of connectivity may occur for users if two different switches are assigned a same nickname, as a forwarding path will be unknown to downstream nodes. As another example, a network failure may occur if incorrect multicast records (based on two different switches being assigned a same nickname) create a network loop. In some embodiments of the disclosure, nickname assignment may be handled manually by way of a network administration task. However, manual assignment is subject to high overhead, and is prone to operator error; an operator may accidentally assign a same nickname to two switches. Accordingly, in some embodiments of the disclosure, nickname assignment may be automated by the switches themselves to prevent the possibility of human error causing a nickname to be assigned to two or more switches.

Figures 1, 2:
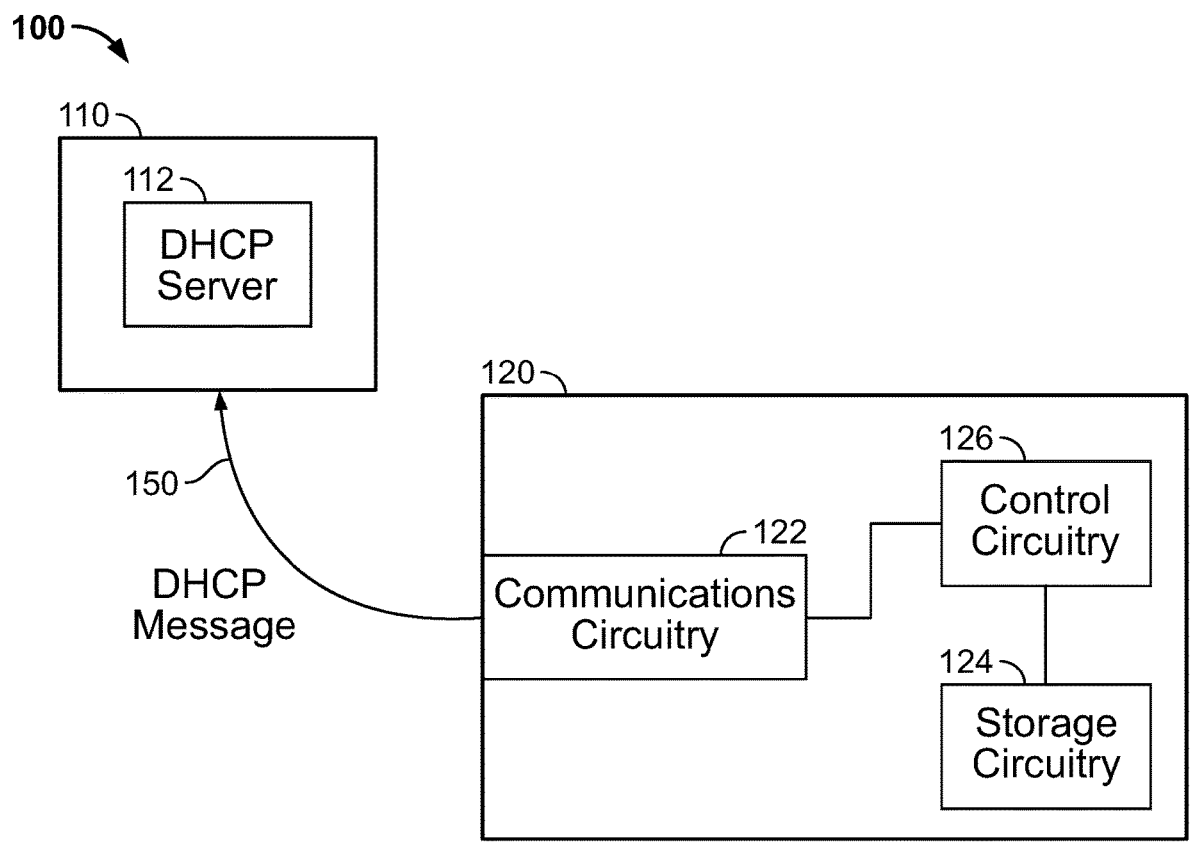
FIG. 1 depicts an illustrative network of switches, where a switch of the network may automatically configure nicknames for the other switches of the network, in accordance with some embodiments of the disclosure.
FIG. 2 depicts an exemplary IP address assigned to a switch by a different switch that is responsible for assigning nicknames, including a breakdown of how a nickname is assigned to that switch, in accordance with some embodiments of the disclosure.

FIG. 1 depicts an illustrative network of switches, where a switch of the network may automatically configure nicknames for the other switches of the network, in accordance with some embodiments of the disclosure. Network 100 comprises switch 110, switch 120, and additional switches 130. Network 100 is generally described as a SPBM network, but may be any other form of network (e.g., a fabric area network). As will be described below, responsibility for nickname assignment has been designated for switch 110. In response to this designation, and as will also be described in detail below, switch 110 instantiates a DHCP server (referred to interchangeably herein as a DHCP service) that is internal to switch 110.

Switch 120 includes illustrative components, such as communications circuitry 122, storage circuitry 124, and control circuitry 126. These components may be implemented by any switch, such as switch 110 and other switches 130. Communications circuitry 122 may be any known receiver, transmitter, transceiver, or any other known means of transmitting and/or receiving data. Storage circuitry 124 may be any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc. Control circuitry 126 may be based on any suitable processing circuitry, such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 126 executes instructions stored in memory (i.e., storage circuitry 124).

In some embodiments, control circuitry of switch 110 (e.g., control circuitry 126) may detect that switch 110 has been enabled for automatic nickname assignment for switch 120 and additional switches 130 of network 100. Switch 110 may be enabled for automatic nickname assignment based on input received from a user that specifies that switch 110 is enabled for automatic nickname assignment. Moreover, the input may specify more than one switch (e.g., switch 110 and switch 120) as being responsible for nickname assignment.

The input may include a specification of a pool, or range, of nicknames that switch 110 is to administer, or, alternatively, switch 110 may administer a default pool of nicknames. For example, a network administrator may in some cases desire that a portion of available nicknames be reserved for manual assignment. In such cases, the network administrator may designate a portion, or range, of nicknames (which correspond to host portions of IP addresses) as being available for automatic assignment on network 100 by switch 110. This reserves the remainder of the nicknames for manual assignment. The IP addresses may be either IPv4 or IPv6 addresses.

In response to receiving the input from the user, control circuitry of switch 110 determines that switch 110 will be transformed to a switch that is responsible for assigning nicknames. At the completion of this transformation, switch 110 is capable of assigning nicknames to other switches in the SPBM network.

Switch 110 may then instantiate DHCP service 112, DHCP service 112 being a software module configured to operate on the pool of IP addresses. As an example, when switch 120 joins network 100, switch 120 may broadcast DHCP message 150 that indicates that switch 120 has joined the network. DHCP message 150 may be any message transmitted by switch 120 for the purpose of switch 120 joining a network or otherwise being discovered (e.g., a "discover" message or any other message for DHCP discovery under a DHCP protocol). Having instantiated DHCP service 112, switch 110 is configured to respond to receipt of DHCP message 150 by assigning switch 120 with an IP address (either IPv4 or IPv6). In order to assign an IP address to switch 120, DHCP service 112 obtains an IP address (e.g., a next unused entry of the mapped pool of IP addresses described above), and assigns this IP address to an interface of switch 120.

Following the IP address assignment by switch 110, control circuitry of switch 120 may extract the host portion of the assigned IP address, and use the host portion as a nickname. For example, control circuitry switch 120 may receive a message including the IP address assignment, and may responsively extract the host portion of the assigned IP address and assign this host portion as the nickname of switch 120. Alternatively, control circuitry of switch 110 may assign the host portion to be the nickname of switch 120. Because host portions of IP addresses are unique, this process ensures that the assigned nickname is also unique. If a subnet mask is applied to obscure the subnet of the assigned IP address, the host portion is identified, and thus the nickname of switch 120 may be obtained for assignment.

FIG. 2 depicts an exemplary IP address assigned to a switch by a different switch that is responsible for assigning nicknames, including a breakdown of how a nickname is assigned to that switch, in accordance with some embodiments of the disclosure. FIG. 2 depicts IP address 202, which may be assigned to a switch (e.g., switch 120) by switch that is responsible for assigning nicknames (e.g., switch 110), in any manner described in this disclosure. IP address 204 is composed by a subnet portion (subnet 204) and a host portion (host 206). As described above, host 206 acts as a nickname for the switch (e.g., switch 120).

The following illustrative configuration code exemplifies a manner in which switch 110 may assign nicknames (including the nickname given that corresponds to host 206) to switch 120 and switches 130 in an IPv4 environment:

```
subnet 10.224.0.0 netmask 255.240.0.0 {
    option subnet-mask 255.240.0.0;
    option broadcast-address 10.239.255.255;
    range 10.234.0.10 10.234.255.254;
}
```

Following from the pseudocode above, a range of IP addresses from 10.234.0.10 to 10.234.255.254 may be designated for assignment by DHCP server 112 (e.g., because those IP addresses are default IP addresses, or because a network administrator designated that range of host portions for assignment). The first IP address within that range, IP address 202 (10.234.0.10/12) is divided into a 12 bit subnet portion (signified by the "/12" and a 20 bit host portion, thus resulting in subnet 204 (10.224.0.0) and host 206 (0.10.0.10). Next IP addresses within that range are similarly divided into 12 bit subnet portions, and 20 bit host portions, thus resulting in an assignment of nicknames by way of the host portion. The use of a 12 bit subnet and a 20 bit host portion are merely exemplary; any size subnet and host portion may be used.

A similar approach may be used if using DHCP server 112 to assign IPv6 addresses; some of (e.g., 20 bits of) the host portion of the IPv6 address may be used as a nick-name. Exemplary configuration code for an IPv6 assignment is provided below:

```
subnet6 2001:db8:0:1::/64 {
    # Range for clients
    range6 2001:db8:0:1::129
    2001:db8:0:1::254;
}
```

Following from the exemplary configuration code above, a range of IPv6 addresses from 2001:db8:0:1::129 to 2001:db8:0:1::254 may be designated for assignment by DHCP server 112 (e.g., because a network administrator designated that range of host portions for assignment). The first IPv6 address within that range, IPv6 address (2001:db8:0:1::129/64) is divided into a 64 bit subnet portion (signified by the "/64" and a 64 bit host portion, thus resulting in subnet 2001:db8:0:1:: and host ::129. Next IPv6 addresses within that range are similarly divided into 64 bit subnet portions, and 64 bit host portions, thus resulting in an assignment of nicknames by way of the host portion. The use of a 64 bit subnet and a 64 bit host portion are merely exemplary; any size subnet and host portion may be used. For example, the host portion may be 44 bits (all zero), plus 20 non-zero bits for the actual nickname (e.g., IPv6 address ::129 (alternatively represented as 0000:0000:0129) may have designated nickname 0:01:29).

Figure 3:
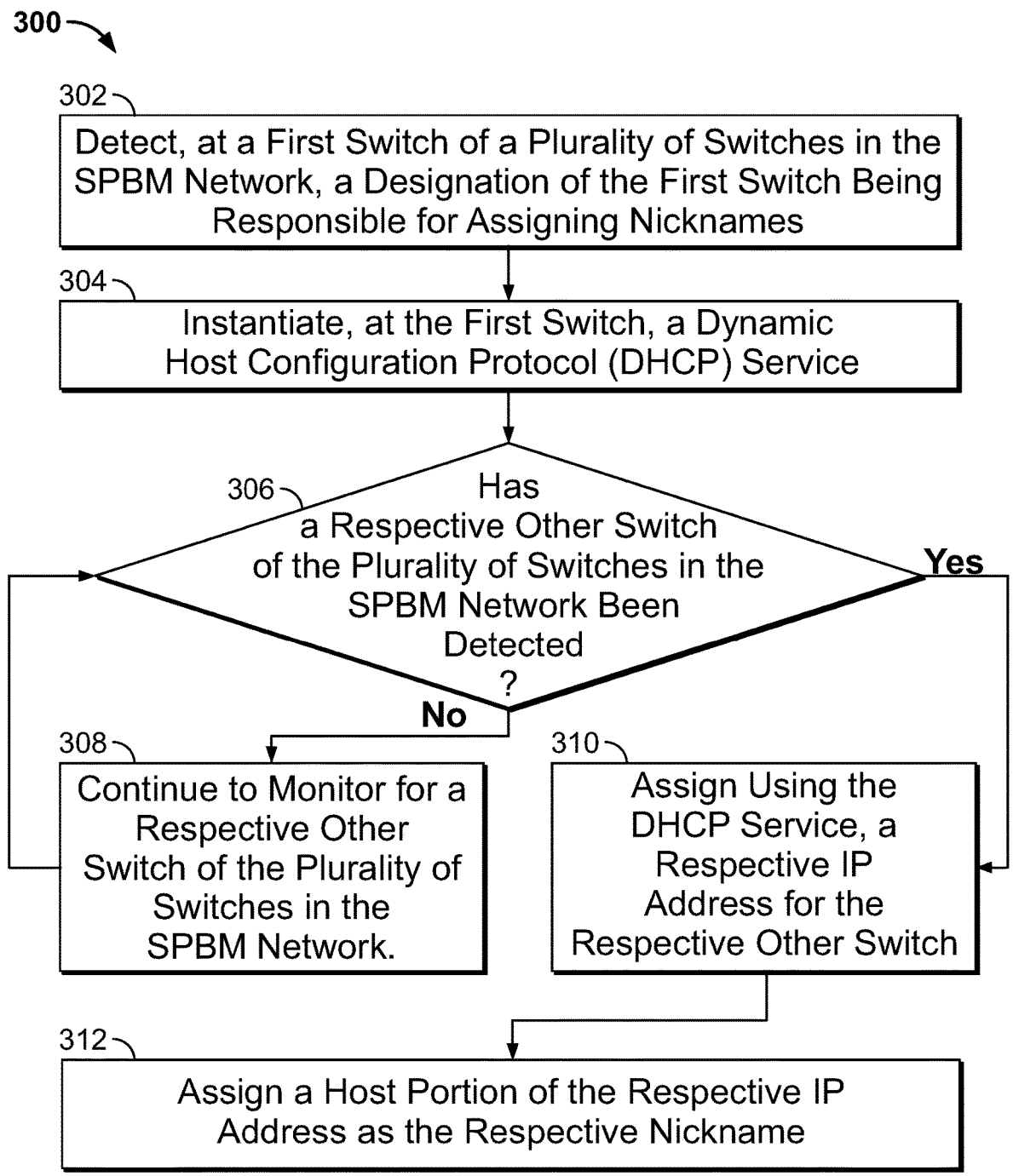
FIG. 3 depicts an illustrative flow chart showing steps for automatically assigning nicknames in a SPBM network, in accordance with some embodiments of the disclosure.

FIG. 3 depicts an illustrative flow chart showing steps for automatically assigning nicknames in a SPBM network, in accordance with some embodiments of the disclosure. Process 300 begins at 302, where control circuitry (e.g., control circuitry 126) of a first switch (e.g., of switch 110) detects a designation of the first switch as being responsible for assigning nicknames. Manners in which the detection of 302 may be performed are described in the foregoing, and further exemplified in FIG. 4, described in detail below.

Process 300 continues to 304, where the control circuitry may instantiate, at switch 110, a Dynamic Host Configuration Protocol (DHCP) service (e.g., DHCP server 112, which may use memory from storage circuitry 124). Such instantiation may be performed by initiating a software module that executes DHCP functionality for any discovered nodes on a network. At 306, the control circuitry determines whether a respective other switch (e.g., switch 120) of the plurality of switches in the SPBM network has been detected. For example, as described above, the control circuitry determines whether receipt of DHCP message 150 is detected at switch 110 (e.g., by way of communications circuitry 122). If not, process 300 goes to 308, where the control circuitry continues to monitor for a respective other switch of the plurality of switches in the SPBM network, and consequently continually performs the determination at 308 until a respective other switch has been detected.

If the determination at 308 is in the affirmative, process 300 continues to 310, where the control circuitry assigns, using the DHCP service, a respective IP address (e.g., IP address 202) for the respective other switch (e.g., switch 120). Manners in which the IP address is assigned in connection with 312 are described above (e.g., with respect to FIG. 2), and are also described with respect to FIG. 5 below. Process 300 then goes to 312, where control circuitry (e.g., of switch 110) assigns a host portion of the respective IP address as the respective nickname (e.g., by sending a value equaling the value of the host portion to switch 120, and instructing switch 120 to use this value as the nickname). Alternatively, at 312, control circuitry of switch 120 receives the IP address, extracts the host portion of the respective IP address, and assigns the host portion as the nickname for switch 120.

Figure 4:
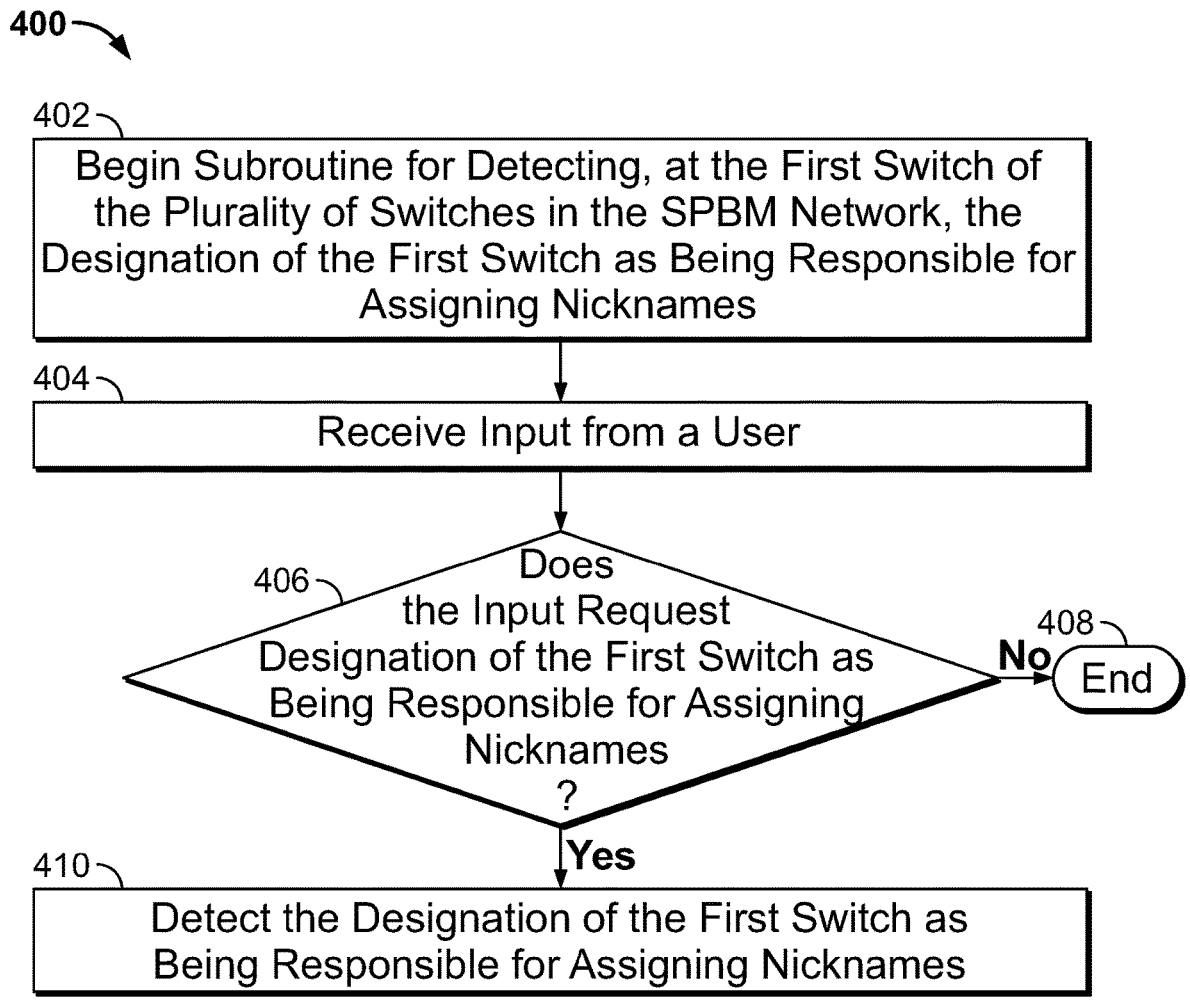
FIG. 4 depicts an illustrative flow chart showing steps for detecting, at a switch in an SPBM network, a designation of the switch as being responsible for assigning nick names, in accordance with some embodiments of the disclosure.

FIG. 4 depicts an illustrative flow chart showing steps for detecting, at a switch in an SPBM network, a designation of the switch as being responsible for assigning nick names, in accordance with some embodiments of the disclosure. Process 400 begins at 402, where control circuitry (e.g., control circuitry 126 of switch 110), begins a subroutine for detecting, at the first switch of the plurality of switches in the SPBM network (e.g., switch 110), the designation of the first switch as being responsible for assigning nicknames. At 404, control circuitry 404 receives input from a user (e.g., input that expressly designates the first switch as being responsible for assigning nicknames, received by way of communications circuitry 122). At 406, the control circuitry determines whether the input requests designation of the first switch as being responsible for assigning nicknames. If the input request does not request designation of the first switch as being responsible for assigning nicknames, process 400 ends at 408. If, however, the input request does request designation of the first switch as being responsible for assigning nicknames, process 400 continues to 410, where the control circuitry detects the designation of the first switch as being responsible for assigning nicknames.

Figure 5:
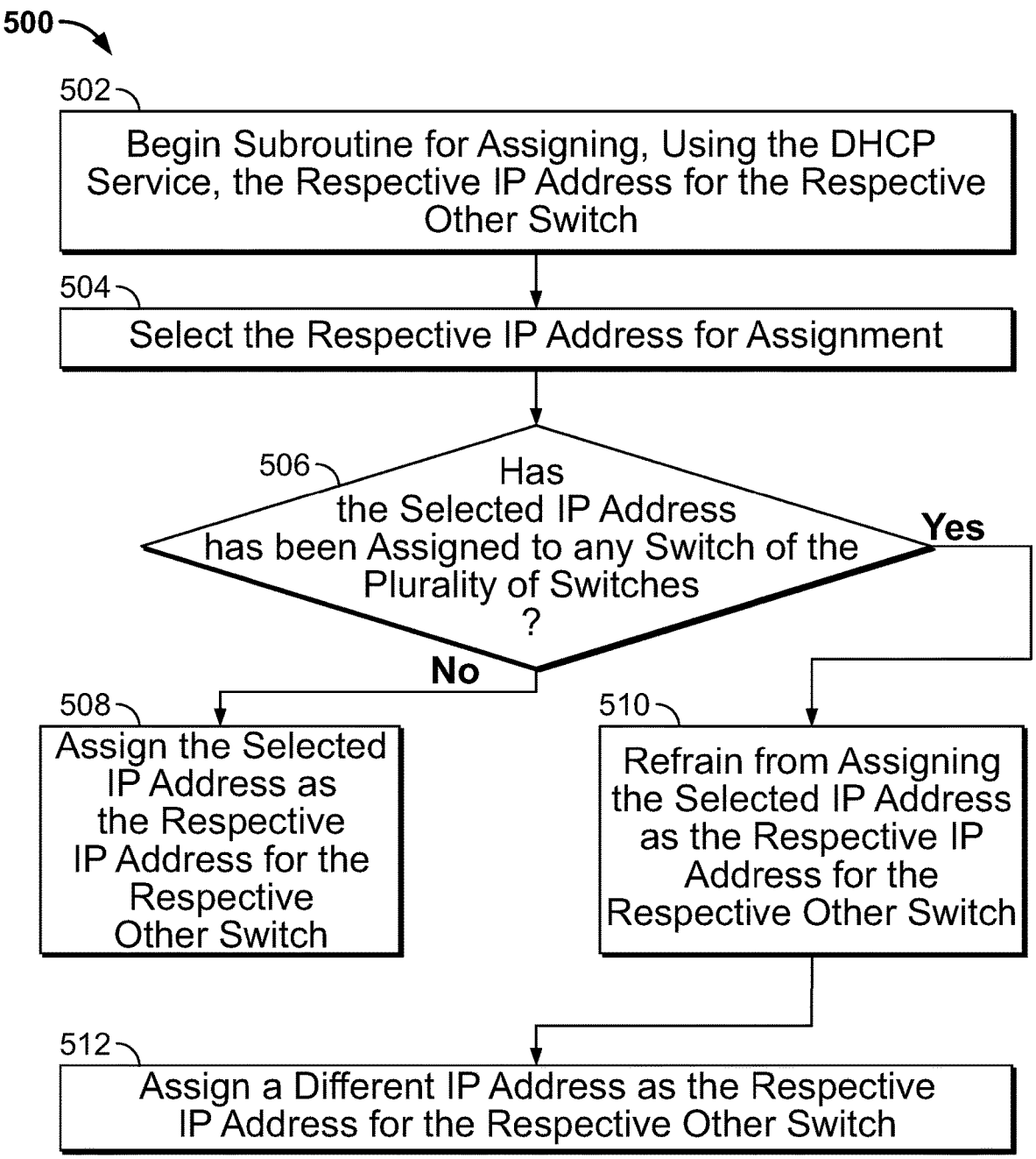
FIG. 5 depicts an illustrative flowchart showing steps for assigning, using a DHCP service of a switch responsible for assigning nicknames, a respective IP address for a discovered switch on a shared SPBM network, in accordance with some embodiments of the disclosure.

FIG. 5 depicts an illustrative flowchart showing steps for assigning, using a DHCP service of a switch responsible for assigning nicknames, a respective IP address for a discovered switch on a shared SPBM network, in accordance with some embodiments of the disclosure. Process 500 begins at 502, where control circuitry (e.g., control circuitry 126 of switch 110) begins a subroutine for assigning, using the DHCP service, the respective IP address for the respective other switch. Process 500 continues to 504, where the control circuitry selects select the respective IP address for assignment (e.g., IP address 202). For example, the selection may be made in sequence from a beginning to an end of a range of IP addresses as specified by a user, as described in the foregoing.

Process 500 continues to 506, where the control circuitry determines whether the selected IP address has been assigned to any switch of the plurality of switches (e.g., by referencing memory of storage circuitry 124 of switch 110).

For example, the control circuitry may query a register of assigned IP addresses to verify that an IP address selected for assignment (e.g., to switch 120) has already been assigned to another switch (e.g., a switch of additional switches 130). If the determination of 506 is made in the negative, process 500 continues to 508, where the control circuitry assigns assign the selected IP address as the respective IP address for the respective other switch (e.g., by adding the selected IP address to the register of assigned IP addresses). If the determination of 506 is made in the affirmative, then process 500 continues to 510, where the control circuitry refrains from assigning the selected IP address as the respective IP address for the respective other switch. At 512, the control circuitry assigns a different IP address as the respective IP address for the respective other switch.

For brevity, elements of processes 300-500 that were described in detail with respect to FIGS. 1 and 2 are not repeated in the description of FIGS. 3-5, but those above-described elements are intended to carry into their respective descriptions of FIGS. 3-5.

The foregoing describes systems, methods, and apparatuses for automatically assigning nicknames in a SPBM network. The above-described embodiments of the present disclosure are presented for the purposes of illustration and not of limitation. Furthermore, the present disclosure is not limited to a particular implementation. For example, one or more steps of the methods described above may be performed in a different order (or concurrently) and still achieve desirable results. In addition, the disclosure may be implemented in hardware, such as on an application-specific integrated circuit (ASIC) or on a field-programmable gate array (FPGA). The disclosure may also be implemented in software by, for example, encoding transitory or non-transitory instructions for performing the process discussed above in one or more transitory or non-transitory computer-readable media.

While some portions of this disclosure may make reference to "convention," or "related art," any such reference is merely for the purpose of providing context to the invention (s) of the instant disclosure, and does not form any admission, express or implied, as to what constitutes the state of the prior art. As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

What is claimed is:

1. A method for automatically assigning nicknames in a Shortest Path Bridging Multicast (SPBM) Media Access Control in Media Access Control (MAC in MAC) network (SPBM network), the method comprising:
    detecting, at a first switch of a plurality of switches in the SPBM network, a designation of the first switch as being responsible for assigning the nicknames;
    in response to detecting the designation, instantiating, at the first switch, a Dynamic Host Configuration Protocol (DHCP) service;
    detecting, at the first switch, using the DHCP service, a second switch of the plurality of switches in the SPBM network;
    in response to detecting the second switch, assigning, using the DHCP service, an Internet Protocol (IP) address for the second switch; and
    assigning, by the first switch, a host portion of the IP address as a nickname of the second switch.

2. The method of claim 1, wherein detecting, at the first switch of the plurality of switches in the SPBM network, the designation of the first switch as being responsible for assigning the nicknames comprises:
    receiving an input;
    determining whether the input requests designation of the first switch as being responsible for assigning the nicknames; and
    in response to determining that the input requests designation of the first switch as being responsible for assigning the nicknames, detecting the designation of the first switch as being responsible for assigning the nicknames.

3. The method of claim 2, wherein the input specifies a range of nicknames for use by the DHCP service, and wherein the method further comprises instructing the DHCP service to assign IP addresses to the plurality of switches on the SPBM network using host portions that are within the range of nicknames.

4. The method of claim 1, wherein assigning, using the DHCP service, the IP address for the second switch, further comprises:
    selecting the IP address for assignment;
    determining whether the selected IP address has been assigned to any switch of the plurality of switches; and
    in response to determining that the selected IP address has been assigned to any switch of the plurality of switches:
        refraining from assigning the selected IP address as the IP address for the second switch; and
        assigning a different IP address as the IP address for the second switch.

5. The method of claim 1, wherein assigning, using the DHCP service, the IP address for the second switch, further comprises:
    adopting a DHCP lease time for the IP address that is longer than a reboot time of the second switch;
    detecting that the second switch has rebooted; and
    maintaining the assignment for the IP address to the second switch notwithstanding that the second switch has rebooted.

6. The method of claim 1, wherein the nickname comprises a 20-bit portion of the host portion of the IP address.

7. The method of claim 6, wherein the 20-bit host portion and a 24-bit Internet Service Instance Identifier (I-SID) form an address for use on the SPBM network.

8. The method of claim 7, wherein the I-SID represents a traffic flow, and wherein the first switch of the plurality of switches prunes traffic of the traffic flow from streams with downstream nodes that do not subscribe to the traffic flow based on the I-SID value.

9. The method of claim 1, wherein the second switch, when transmitting multicast traffic over the SPBM network, includes the nickname in the multicast traffic.

10. The method of claim 9, wherein a downstream switch of the plurality of switches on the SPBM network that receives the multicast traffic determines the shortest path tree from which the multicast traffic has traveled based on the nickname.

11. A system for automatically assigning nicknames in a Shortest Path Bridging Multicast (SPBM) Media Access Control in Media Access Control (MAC in MAC) network (SPBM network), the system comprising:
    a first switch comprising control circuitry configured to:

detect, at the first switch of a plurality of switches in the SPBM network, a designation of the first switch as being responsible for assigning the nicknames;

in response to detecting the designation, instantiate, at the first switch, a Dynamic Host Configuration Protocol (DHCP) service;

detect, at the first switch, using the DHCP service, a second switch of the plurality of switches in the SPBM network;

in response to detecting the second switch, assign, using the DHCP service, an Internet Protocol (IP) address for the second switch; and assign a host portion of the IP address as a nickname of the second switch, wherein the control circuitry is configured to assign the IP address that uses the host portion corresponding to the nickname that is within a range of nicknames.

12. The system of claim 11, wherein the control circuitry is further configured, when detecting, at the first switch of the plurality of switches in the SPBM network, the designation of the first switch as being responsible for assigning nicknames, to:

receive an input;

determine whether the input requests designation of the first switch as being responsible for assigning the nicknames; and in response to determining that the input requests designation of the first switch as being responsible for assigning the nicknames, detect the designation of the first switch as being responsible for assigning the nicknames.

13. The system of claim 12, wherein the input specifies the range of nicknames for use by the DHCP service.

14. The system of claim 11, wherein the control circuitry is further configured, when assigning, using the DHCP service, the IP address for the second switch, to:

select the IP address for assignment;

determine whether the selected IP address has been assigned to any switch of the plurality of switches; and in response to determining that the selected IP address has been assigned to any switch of the plurality of switches:

refrain from assigning the selected IP address as the IP address for the second switch; and assign a different IP address as the IP address for the second switch.

15. The system of claim 11, wherein the control circuitry is further configured, when assigning, using the DHCP service, the IP address for the second switch, to:

adopt a DHCP lease time for the IP address that is longer than a reboot time of the second switch;

detect that the second switch has rebooted; and maintain the assignment for the IP address to the second switch notwithstanding that the second switch has rebooted.

16. The system of claim 11, wherein the nickname comprises a 20-bit portion of the host portion of the IP address.

17. The system of claim 16, wherein the 20-bit host portion and a 24-bit Internet Service Instance Identifier (I-SID) form an address for use on the SPBM network.

18. The system of claim 17, wherein the I-SID represents a traffic flow, and wherein first switch of the plurality of switches prunes traffic of the traffic flow from streams with downstream nodes that do not subscribe to the traffic flow based on the I-SID value.

19. The system of claim 11, wherein the second switch, when transmitting multicast traffic over the SPBM network, includes the nickname in the multicast traffic.

20. The system of claim 19, wherein a downstream switch of the plurality of switches on the SPBM network that receives the multicast traffic determines the shortest path tree from which the multicast traffic has traveled based on the nickname.

* * * * *